(12) United States Patent
Farley et al.

(10) Patent No.: US 8,890,705 B2
(45) Date of Patent: Nov. 18, 2014

(54) LOCATION DETERMINATION USING RADIO WAVE MEASUREMENTS AND PRESSURE MEASUREMENTS

(75) Inventors: Richard O. Farley, San Diego, CA (US); Dimosthenis Kaleas, Carlsbad, CA (US); Gianni Giorgetti, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 771 days.

(21) Appl. No.: 12/837,583

(22) Filed: Jul. 16, 2010

(65) Prior Publication Data

US 2012/0013475 A1  Jan. 19, 2012

(51) Int. Cl.
| | |
|---|---|
| G08B 21/00 | (2006.01) |
| G01S 5/14 | (2006.01) |
| G01S 5/00 | (2006.01) |
| H04W 24/00 | (2009.01) |
| H04B 7/00 | (2006.01) |
| H04B 17/00 | (2006.01) |
| G08C 15/00 | (2006.01) |
| H04L 12/28 | (2006.01) |
| G01S 19/46 | (2010.01) |

(52) U.S. Cl.
CPC .............. G01S 5/145 (2013.01); G01S 5/0045 (2013.01)
USPC ........ 340/665; 455/456.1; 455/457; 455/513; 455/67.11; 370/252; 370/254; 342/357.29

(58) Field of Classification Search
USPC ........ 340/665; 370/252, 254; 455/457, 456.1; 342/357.29
See application file for complete search history.

(56) References Cited

U.S. PATENT DOCUMENTS

| | | | | |
|---|---|---|---|---|
| 2009/0256742 A1* | 10/2009 | Kawaguchi et al. | ....... | 342/357.1 |
| 2009/0274113 A1* | 11/2009 | Katz | .............................. | 370/330 |
| 2010/0073229 A1* | 3/2010 | Pattabiraman et al. | .. | 342/357.09 |
| 2010/0130230 A1* | 5/2010 | Aggarwal et al. | .......... | 455/456.1 |
| 2010/0135178 A1* | 6/2010 | Aggarwal et al. | .............. | 370/252 |
| 2010/0172259 A1* | 7/2010 | Aggarwal et al. | .............. | 370/252 |
| 2010/0318293 A1* | 12/2010 | Brush et al. | ................... | 701/211 |
| 2011/0116453 A1* | 5/2011 | Huang et al. | .................. | 370/329 |

FOREIGN PATENT DOCUMENTS

| | | |
|---|---|---|
| EP | 2182321 A1 | 5/2010 |
| FR | 2888940 A1 | 1/2007 |
| WO | WO0058744 A1 | 10/2000 |

OTHER PUBLICATIONS

International Search Report and Written Opinion—PCT/US2011/044175—ISA/EPO—Oct. 10, 2011.

\* cited by examiner

*Primary Examiner* — Jack K Wang
(74) *Attorney, Agent, or Firm* — Jeffrey D. Jacobs

(57) ABSTRACT

A method and apparatus for determining a location of a wireless device using radio waves and pressure measurements is disclosed. In one embodiment, a plurality of Radio Signal Strength (RSS) measurements are used to trilaterate an approximate location of the wireless device. The wireless device also takes pressure measurements that are compared with a second pressure measurement made by at least one other pressure sensor at a known elevation and in a local area near the wireless device. This comparison is used to generate an accurate estimate of the elevation of the wireless device. The accurate estimate of elevation may be combined with the RSS measurements to yield an accurate estimate of the location of the wireless device.

17 Claims, 7 Drawing Sheets

802

| Beacon ID | Time | RSS |
|---|---|---|
| 1 | 3:35:26 | -20.3 dbm |
| 4 | 3:35:26 | -22.8 dBm |
| 6 | 3:35:26 | -5.1 dBM |
| 8 | 3:35:27 | -72.3 dBm |
| 13 | 3:35:27 | -53.8 dBm |
| 17 | 3:35:27 | -19.8 dBM |
| 25 | 3:35:27 | -8 dBM |
| 29 | 3:35:27 | -76.4 dBM |

| | | |
|---|---|---|
| Atmospheric Pressure | | $100.153 \times 10^4$ PA |
| Magnetic Heading | 3:35:27 | 342.5 deg |
| North Acceleration | 3:35:27 | 0.2 m/s |
| East Acceleration | 3:35:27 | -0.1 m/s |
| Down Acceleration | 3.35:27 | 9.8 m/s |

| Beacon ID | Time | RSS |
|---|---|---|
| 6 | 3:35:26 | -30.3 dbm |
| 9 | 3:35:26 | -22.1 dBm |
| 10 | 3:35:26 | -15.1 dBM |
| 11 | 3:35:27 | -62.7 dBm |
| 13 | 3:35:27 | -51.8 dBm |
| 17 | 3:35:27 | -39.8 dBM |
| 25 | 3:35:27 | -18 dBM |
| 29 | 3:35:27 | -76.4 dBM |

Atmospheric Pressure    $1000.1 \times 10^4$

FIG. 9

LOCATION DETERMINATION USING RADIO WAVE MEASUREMENTS AND PRESSURE MEASUREMENTS

BACKGROUND

1. Field

The invention relates to location determination. More particularly, the invention relates to location determination using radio wave measurements and pressure measurements.

2. Background

Many conventional wireless devices rely on the Global Positioning System (GPS) to determine their present location. The GPS system uses spread spectrum signals transmitted from space that do not have much power near the earth's surface. Consequently, the signals do not generally penetrate the walls of buildings. Inside buildings, wireless device users are usually denied the use of the navigation features in their wireless devices. Moreover, even when GPS is available, the vertical location accuracy is often less than desired and unacceptably inaccurate for many applications.

There is a need for a system and method that would enable wireless devices to determine their present location while inside a building. In addition, there is a need for a system and method for more precisely determining the vertical position of a wireless device. The present invention addresses these needs as well as other needs.

SUMMARY

In one embodiment, a plurality of Radio Signal Strength (RSS) measurements is made with respect to a wireless device. The RSS measurements are used to determine the approximate location of the wireless device. The barometric pressure at the wireless device is also measured and may be compared with the barometric pressure measured by a sensor at a nearby location where the vertical position of the sensor is known a priori. The comparison of the barometric pressures may then be used to determine the precise vertical location of the wireless device. The barometric pressure measurements and the RSS signal measurements may also be combined to determine the three dimensional location of the wireless device.

In alternate embodiments, time-of-flight measurements are made with respect to the wireless device. The time-of-flight measurements may be used to determine the approximate location of the wireless device. The time of flight measurements may also be combined with barometric measurements to determine the three dimensional (vertical and horizontal) location of the wireless device.

In still other embodiments, other sensors and models are used in conjunction with RSS measurements and barometric pressure measurements to determine the location of the wireless device. Accelerometers, gyroscopes, digital compasses, digital maps and/or movement models may also be used to precisely determine the location of the wireless device.

BRIEF DESCRIPTION OF THE DRAWINGS

Claimed subject matter is particularly pointed out and distinctly claimed in the concluding portion of the specification. However, such subject matter may be understood by reference to the following detailed description when read with the accompanying drawings in which:

FIG. 8 show an exemplary report generated by the wireless device shown in FIG. 6;

FIG. 9 shows an exemplary report generated by one of the network nodes shown in FIG. 1.

DETAILED DESCRIPTION

Methods and apparatus that implement the embodiments of the various features of the disclosure will now be described with reference to the drawings. The drawings and the associated descriptions are provided to illustrate embodiments of the invention and not to limit the scope of the invention. Reference in the specification to "one embodiment" or "an embodiment" is intended to indicate that a particular feature, structure, or characteristic described in connection with the embodiment is included in at least an embodiment of the invention. The appearances of the phrase "in one embodiment" or "an embodiment" in various places in the specification are not necessarily all referring to the same embodiment. Throughout the drawings, reference numbers are re-used to indicate correspondence between referenced elements. In addition, the first digit of each reference number indicates the figure in which the element first appears.

Figure 1:
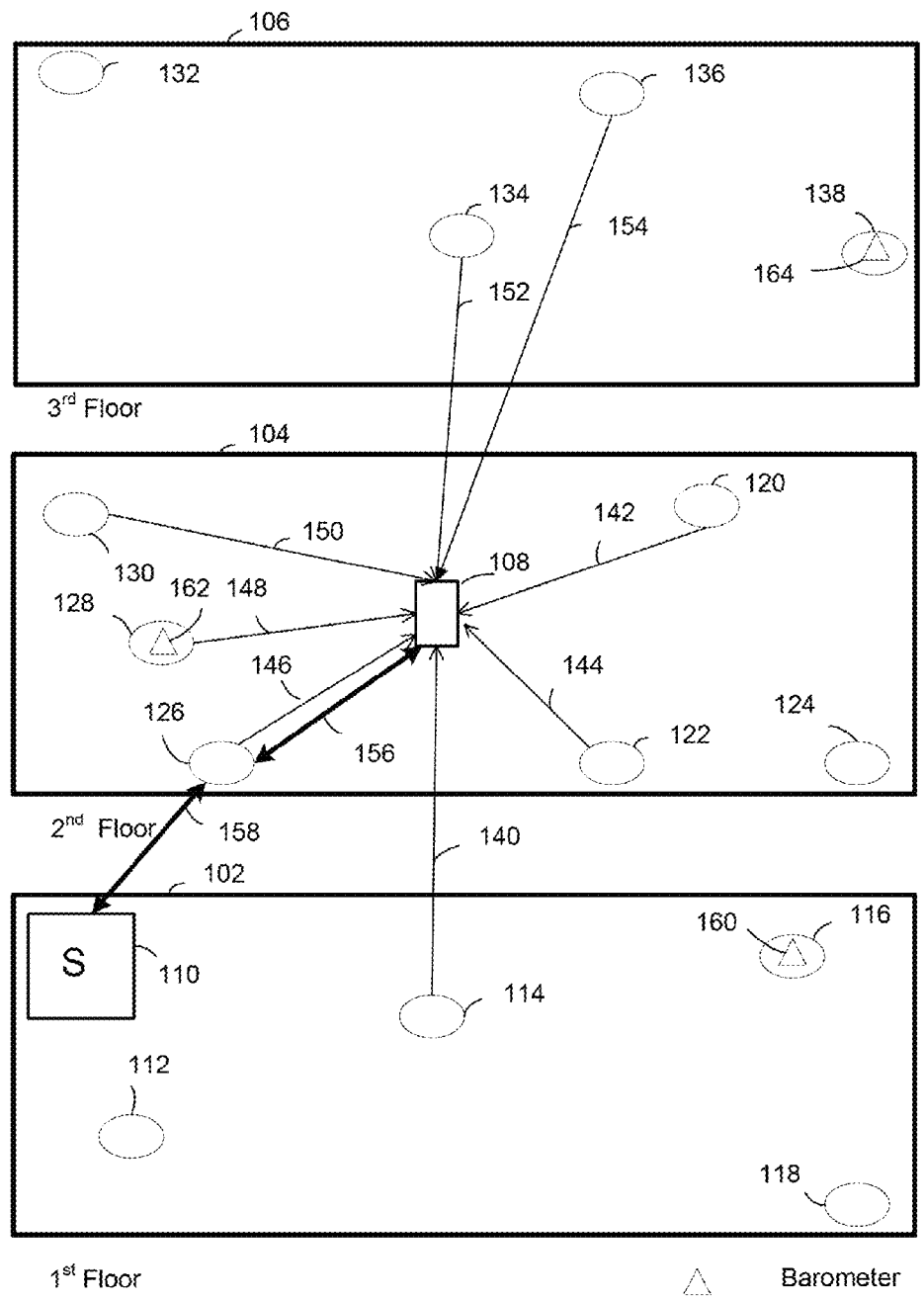
FIG. 1 shows a system diagram of an exemplary embodiment.

Referring to FIG. 1, a system diagram of an exemplary embodiment is shown. The system comprises a server and a plurality of network nodes distributed in a building. The building has a first floor 102, a second floor 104 and a third floor 106. Located on the second floor of the building is a wireless device 108. Located on the first floor of the building are a server 110 and four network nodes 112, 114, 116 and 118. Located on the second floor of the building with the wireless device 108 are six network nodes 120, 122, 124, 126, 128, 130. Located on the third floor of the building are four network nodes 132, 134, 136 and 138.

In this embodiment, the wireless device is located such that it receives radio wave signals from network node 114 located on the first floor of the building, network nodes 120, 122, 126, 128 and 130 located on the second floor of the building, and sensor nodes 134 and 136 located on the third floor of the building. Ray tracings 140, 142, 144, 146, 148, 150, 152 and 154 from respective network nodes 114, 120, 122, 126, 128, 130, 134 and 136 to the wireless device 108 are also shown. A first data hop 156 from wireless device 108 to network node 126 and a second data hop from network node 126 to the server 110 are also illustrated. It should also be noted, that collocated with network nodes 116, 128 and 138 are respective barometric pressure sensors 160, 162 and 164.

The network nodes, according to one embodiment, are networked through a personal area network that is IEEE 802.15 compliant such as ZigBee. The network nodes may be configured to periodically transmit beacon signals with a predetermined transmission power. Thus the beacons signals transmitted from the network nodes may, in turn be sensed and received by wireless device 108. The wireless device 108 may also be configured to determine the Received Signal Strength (RSS) of each of the beacons that it receives. In FIG. 1 wireless device 108 is shown sensing and receiving beacon signals from network nodes 114, 120, 122, 124, 126, 128, 130, 134 and 136 as shown by respective ray tracings 140, 142, 144, 146, 148, 150, 152 and 154.

The network nodes and the wireless device 108 are also in communication with server 110 that may also be IEEE 802.15 compliant. In FIG. 1, wireless device 108 is shown communicating with the server 110 via a first data hop 156 to network node 126 and via a second data hop 158 to the server. The wireless device 108 may also be IEEE 802.15 compliant and may be part of the same personal area network comprising the network nodes and the server 110.

Notably, the wireless device 108 is shown sensing and receiving beacons from network nodes transmitted from different floors of the buildings, allowing for three dimensional trilateration of the location of wireless device 108 (explained more fully hereinafter). Moreover, it should be noted that FIG. 1 also shows that wireless device 108 is unable to sense and receive beacons from network nodes 112, 116, 118, 132 and 138 as depicted by a lack of ray tracings from these network nodes to the wireless device 108. It should be noted that the location of wireless device 108 may still be trilaterated even though many of the network node beacons in the buildings cannot be sensed or received by the wireless device 108, making the system fault tolerant.

In addition to sensing and receiving beacons for trilateration purposes, the wireless device 108 is also configured to measure the atmospheric pressure near the wireless device 108. The measured atmospheric pressure can then be used to determine the vertical location of the wireless device or combined with trilateration measurements to determine the three dimensional location of the wireless device (explained more fully hereinafter).

In this embodiment, network nodes 116, 128 and 138 are collocated with barometric pressure sensors 160, 162 and 164. The vertical locations of barometric pressure sensors 160, 162 and 164 are known a priori so an atmospheric pressure associated with the known vertical location can be determined. The atmospheric pressure at these known vertical locations may be compared with the atmospheric pressure measured at the wireless device 108. The vertical location of the wireless device may then be determined; by interpolation, by applying an atmospheric lapse rate model or any other known pressure estimation or modeling techniques.

The trilateration calculations and barometric pressure measurement comparisons may be made by the server 110 and communicated to the wireless device 108 via the personal area network. This allows for a simpler more power efficient design of the wireless device 108. The wireless device simply makes RSS measurements of any received network node beacons and measures the barometric pressure. These measurements can then be reported the server 110 to determine the location of the wireless device. If the wireless device 108 needs its location, the location information and any other processed information may then be transmitted from the server 110 to the wireless device 108.

Notably, the network nodes form a scalable distributed network. Additional, network nodes may easily be added to increase trilateration accuracy. Barometric pressure sensors may also be added to increase accuracy. Moreover, newly added network nodes may self survey by trilaterating their position from the beacons of other network nodes. Similarly, network nodes collocated with barometric pressure sensors may survey their vertical location by comparing their observed pressure with the observed pressure at other nodes.

The use of a building map with data such as power outlet locations may also be used to help survey any newly added nodes. Server 110 with access to raw RSS measurements may also be used to model barometric errors and network node location errors over time.

In this embodiment, the location calculations are performed by the server 110 to allow for a simpler more energy efficient design of the wireless device 108. It can be appreciated, however, that a dedicated server is not needed and that in alternate embodiments location calculations may be performed by the wireless device 108. In these alternate embodiments, the passively derived location information may be known only to the wireless device 108 and not further communicated to any other devices including the network nodes, addressing potential user privacy issues.

Those skilled in the art will also recognize that in other embodiments the number of barometric pressure sensors may vary and that the number of barometric pressure sensors may be increased for greater accuracy or decreased for simplicity. In some embodiments, there are no barometric pressure sensors collocated with the network nodes. Historical data, weather observations, weather forecasts or other meteorological data may be used to generate a local pressure model. In still other embodiments, the barometric pressure sensors taking pressure measurements may be collocated with other environmental sensors such as a temperature sensors and humidity sensors. In these embodiments, wireless device 108 may also have similar environmental sensors. These additional sensors may then be used to account for the effect of differences in environmental conditions at the barometric pressure sensors and at the wireless device.

Figure 2:
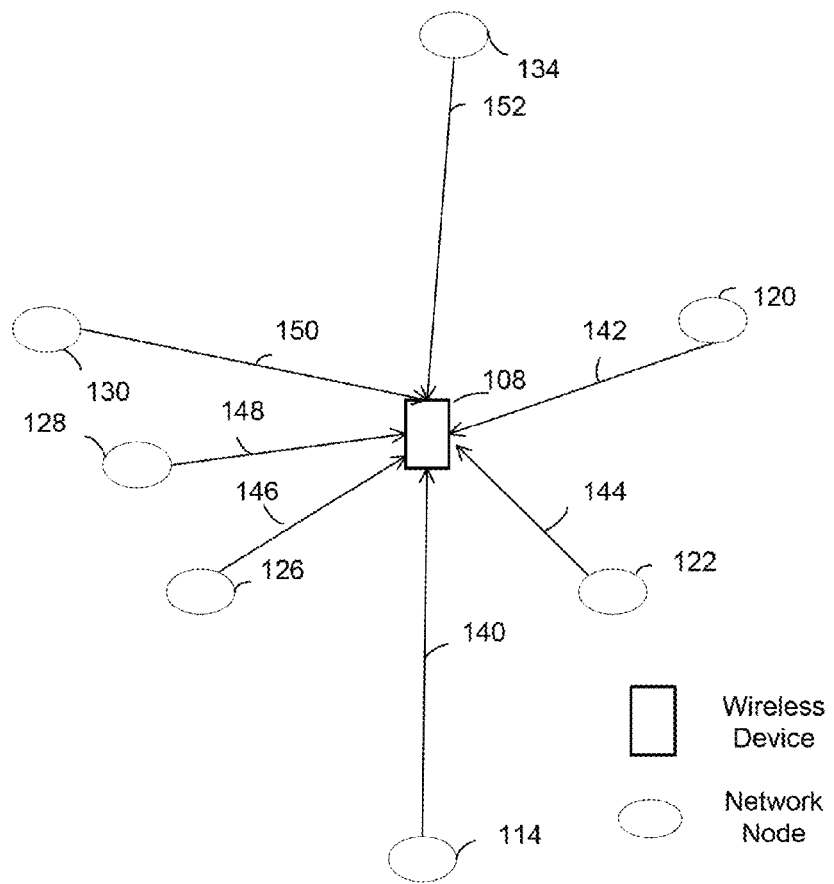
FIG. 2 shows a radio wave signal diagram with exemplary radio signals from the system diagram of FIG. 1.

Referring to FIG. 2, a radio wave signal diagram shows exemplary ray tracings from selected network nodes depicted in FIG. 1. Network nodes 114, 120, 122, 126, 128, 130 and 134 are shown with respective ray tracings 140, 142, 144, 146, 148, 150 and 152 to the wireless device 108.

The beacon signals transmitted from the network nodes travel to the wireless device 108 along their respective ray tracings. It can be appreciated that the power level of the beacons sensed and received by the wireless device 108 will depend on the length of the ray tracing and the transmitted power of the beacon. A long ray tracing will result in a small received power at the wireless device 108 and a short ray tracing will result in a large received power at the wireless device 108. Thus, the received power at wireless device 108 can be used to determine the distances from network nodes 114, 120, 122, 126, 128, 130 and 134 to the wireless device 108.

In this embodiment, beacon signals are used to determine the distances from the network nodes 114, 120, 122, 126, 128, 130 and 134 to the wireless device 108. Those skilled in the art will readily recognize that the distance calculations are not dependent on the transmitted signal being beacon signals. In other embodiments, other types of signals with a known transmit power are used to determine the distances from the network nodes to the wireless device 108. Those skilled in the art will also recognize that the distance calculations may also be made by transmitting a transmit signal from the wireless device 108 and measuring the corresponding RSS of each of the received signals received at each of the network nodes 114, 120, 122, 126, 128, 130 and 134.

In yet another embodiment, the distances from the network nodes 114, 120, 122, 126, 128, 130 and 134 to the wireless device 108 are determined by time-of-flight. That is, time delays are used to determine the distances between network nodes and the wireless device. The transmit times and receive times of signals transmitted along ray tracings 140, 142, 144, 146, 148, 150 and 152 are compared to determine the propagation times along each of the rays. The propagation times may then be used to determine the distances from each of the network nodes to the wireless device 108. The use of round trip timing techniques to determine the distances is also contemplated.

Figure 3:
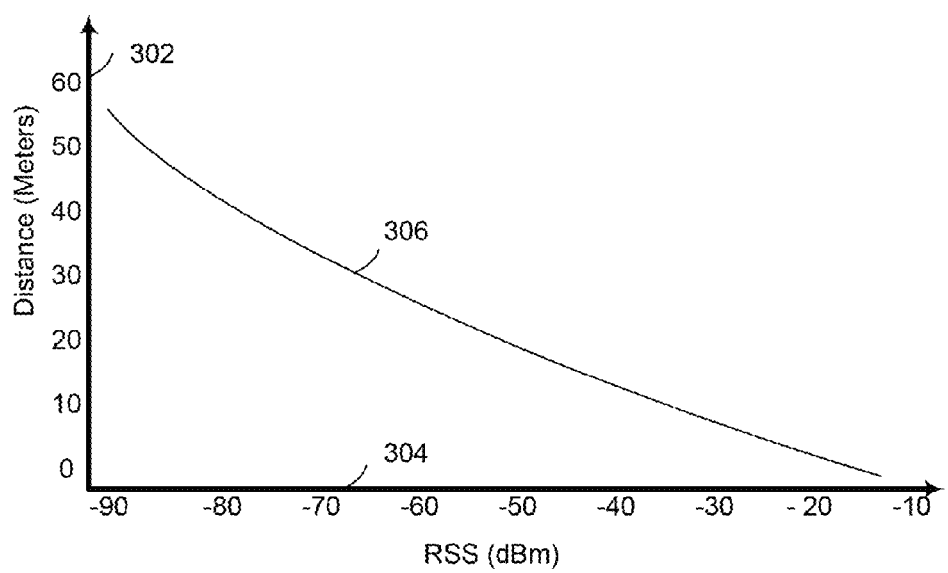
FIG. 3 shows an exemplary RSS vs. Distance plot.

Referring to FIG. 3, an RSS vs. Distance plot is shown. The distance in meters is shown on the ordinate axis 302 and the RSS in dBm is shown on the abscissa axis 304. On the plot, curve 306 shows the distance in meters for a given RSS.

To determine the distance of any network node to the wireless device a path loss model such as the path loss model shown in FIG. 3 may be used. For a given RSS, the path loss model as represented by curve 306 corresponds to a distance in meters from the transmitting device to the receiving device.

Those skilled in the art will recognize that the path loss model may be a predetermined model or may be generated by measuring the RSS at other network nodes. That is, if relative distances between the network nodes are known, the received power of a beacon at other network nodes may be used to generate a path loss model. For example, if network node 126 from FIG. 2 transmits a beacon, the received power observed at network nodes 114, 120, 122, 128, 130 and 134 may be used to generate a model similar to curve 306.

Figure 4:
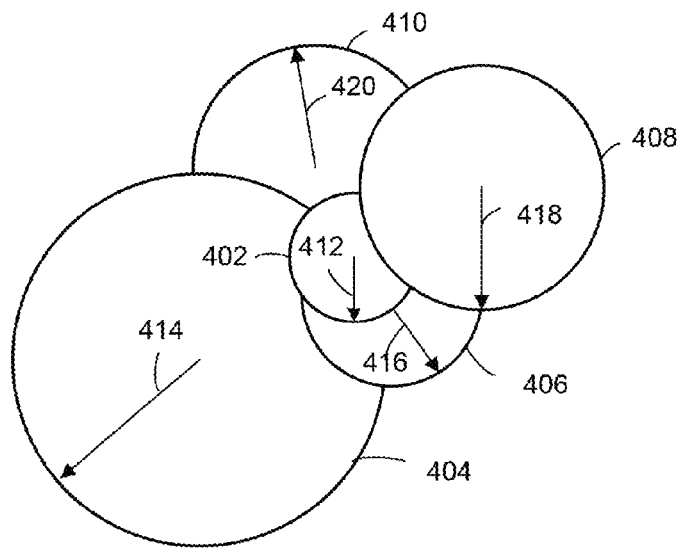
FIG. 4 shows an exemplary method of trilaterating a location.

Referring to FIG. 4, an exemplary method of trilatering a position is shown. Five spheres 402, 404, 406 408 and 410 are shown. The spheres 402, 404, 406 408 and 410 are centered at the position of transmitting network nodes (not shown). The spheres 402, 404, 406 408 and 410 have corresponding radii 412, 414, 416 418 and 420 respectively.

As explained above, the distances between the network node and the wireless device may be determined using a path loss model. The surface area of the each sphere represents a sphere of possible positions of the wireless device based on the RSS of the signal transmitted from the network node at the center of the sphere. For example, sphere 404 has a large radius 414, thus the RSS observed at the wireless device for the beacon transmitted from the network node associated with sphere 404 was a small RSS. Sphere 402 has a small radius 412, thus the RSS observed at the wireless device for the beacon transmitted from the network node associated with sphere 402 was a large RSS.

It should be apparent, that the point of intersection of all of the spheres in FIG. 4 represents the position of the wireless device. Heuristically, the intersection of two spheres is generally a circle, the intersection of three spheres is generally two points, and the intersection of four non identical spheres is at most a single point. Thus with four spheres the position of the wireless device can be determined. Those skilled in the art will also recognize that with five or more spheres there is some measurement redundancy. Errors may thus be modeled and outliers discarded.

Figure 5:
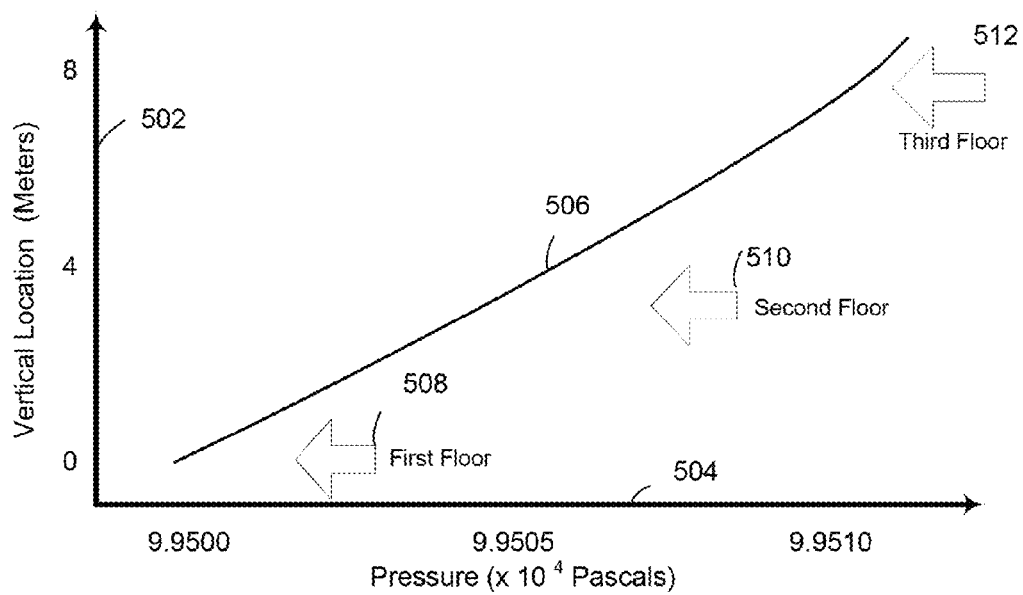
FIG. 5 shows an exemplary plot of barometric pressure and vertical location.

Referring to FIG. 5, a Vertical Location vs. Pressure plot is shown. The distance in meters is shown on the ordinate axis 502 and the pressure is shown on the abscissa axis 504. On the plot, curve 506 shows the distance in meters for a given pressure. A first arrow indicates the vertical location of a first floor 508; a second arrow indicates the vertical location of a second floor 510; and a third arrow indicates the vertical location of a third floor 512.

As explained above, the vertical location of the wireless device may be determined by comparing the pressure measured by a barometric pressure sensor at a nearby location with the pressure measured at the wireless device. In general, vertical location (altitude) can be estimated by measuring air pressure with a barometric pressure sensor. As vertical location (altitude) increases, pressure decreases. The change in pressure associated with a change in vertical location (altitude) is known as the lapse rate.

One problem, with using barometric pressure to determine vertical location (altitude) is that the pressure at any particular vertical location (altitude) may vary with the weather and atmospheric conditions. For example, on a standard day at sea level, the barometric pressure may be 101.325 kPascals; on a high pressure day, the pressure may be 101.7 kPascals; and on a low pressure day the pressure may be 9.925 kPascal. The weather alone can result in pressure changes that would indicate significant changes in altitude.

To overcome this problem, in many embodiments, the system has at least one barometric pressure sensor located at a known vertical location (altitude) near the wireless device. Curve 506 or other lapse rate model can then be biased or otherwise adjusted to be consistent with the measured pressure at the barometric pressure sensor located at a known vertical location (altitude). Since the atmospheric conditions are likely be virtually identical at the barometric pressure sensor and the wireless device, curve 506 or other lapse rate model generated based on the observed pressure at the barometric pressure sensor is likely to be an accurate model for the determining the vertical location (altitude) of the wireless device located nearby.

Barometric sensors are very accurate and the altitude (vertical location) of the wireless device can be determined with good precision. Saliently, with the above described system and method, it is possible, not only to determine which floor 508, 510, 512 the wireless device is located on, but the location of the wireless device relative to the floor. For example, if the wireless device is attached to a user's belt, it would be possible to infer when the user is standing up, sitting down, or lying on the floor.

Figure 6:
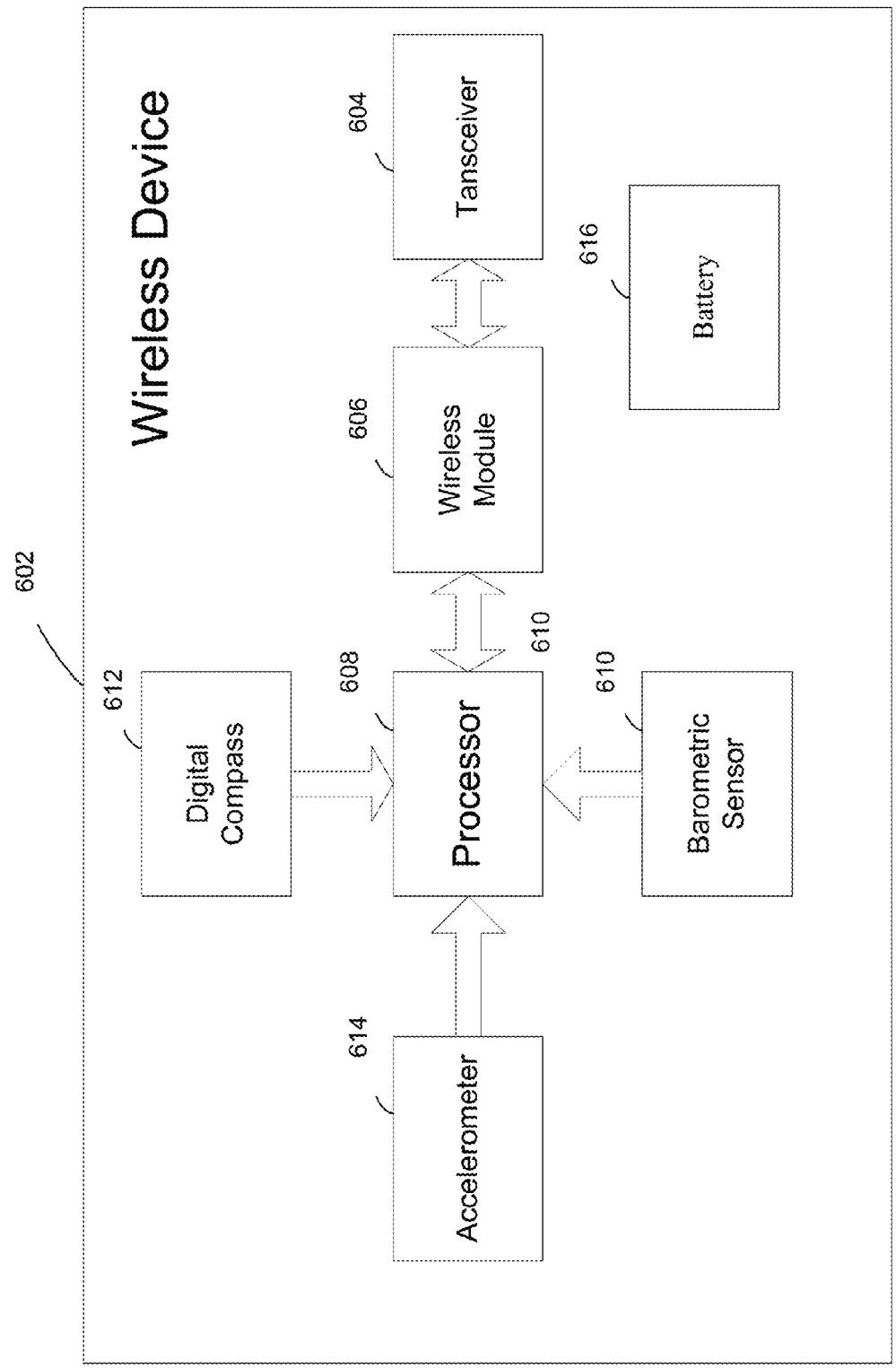
FIG. 6 shows a wireless device according to an exemplary embodiment.

Referring to FIG. 6, an exemplary wireless device 602 according to an exemplary embodiment is shown. The wireless device 602 has a transceiver 604 in communication with a wireless module 606. The wireless module 606 is in communication with a processor 608. The processor 608 receives input from a barometric sensor 610, a digital compass 612 and an accelerometer 614. The wireless device 602 also has a battery 616 for powering the electronics in the wireless device 602.

Located in the wireless device 602 is a transceiver 604 for receiving beacon signals and other transmission from network nodes and transmitting RSS and barometric sensor measurement reports (explained more fully hereinafter). The transceiver is in communication with a wireless module 606 that is IEEE 802.15.4 compliant such as the Jennic JN 5139. The wireless module 606, in turn, is connected with a processor that processes input from a barometric sensor 610 such as the BMP 085; a digital compass 612 such as the OS4000-T; and a three axis accelerometer 614.

Those skilled in the art will recognize that wireless device 602 can be designed and packaged as a small and lightweight device. For example, the wireless device 602 may be constructed to be worn on a user as a tag. This embodiment allows the server to track the location and movement of a person wearing the tag while they are in a building.

It can be also appreciated that wireless device 602 can be packaged in a variety form factors. For example wireless device 602 may be packaged as part of a cell phone or tablet computer that allows a user to display their present location on a display relative to a building map providing the user with situational awareness. The display of relative navigation information such as relative bearing arrows to places of interest is also contemplated.

Figure 7:
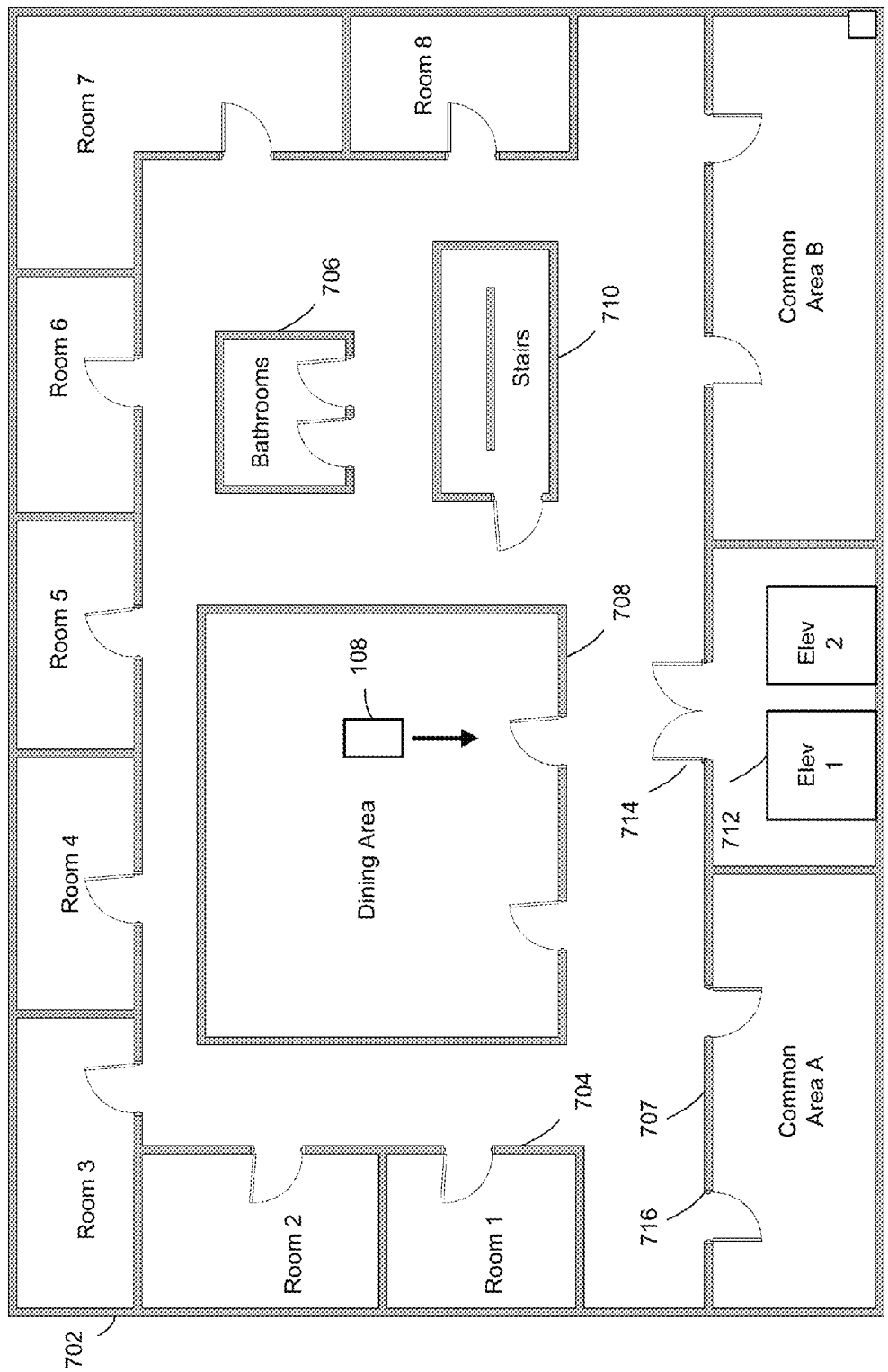
FIG. 7 shows a floor plan of one of the building floors shown in the system diagram of FIG. 1.

Referring to FIG. 7, an exemplary floor plan 702 for the second floor of the building shown in FIG. 1 is shown. The floor plan 702 shows that wireless tag is 108 located in a dining area. The floor plan also shows eight individual rooms 704, bathrooms 706, two common areas 707, a staircase 710 and elevator 712. Double doors 714 open to allow access to the elevators. A plurality of doors 716 are shown throughout the floor plan.

As explained previously, the location of the wireless device may be determined through trilateration and pressure measurements. The location may be even more accurately determined by using the floor plan 702 information shown in FIG. 7; wireless device sensors information and applying user movement models. For example, reasonable inferences may be made about the location of the wireless device based on the floor plan 702. For instance, we know that the wireless device 108 is not capable of moving through solid structure, so when the wireless device transitions from the dining area 708 to the hallway, we know that the wireless device 108 is going through one of the dining area doors.

The on-board sensors can also provide additional information about the position of the wireless device. For example, the distance estimates used in trilateration may be a bit noisy due to multipath or path loss variances and pressure measurements may be a bit noisy due to air disturbances. Data from accelerometers, digital compasses and other sensors in the wireless device can be combined with the trilateration and pressure estimates to enhance accuracy and smooth noisy estimates.

Similarly a movement model may be applied in locating the wireless device. For example, if the wireless device is packaged to be worn as a wireless tag, we can infer that the movement of the tag will be similar to a person's movement. A person is most likely going to walk through the center of a doorway and walk down the center of a hallway at a walking rate. A person may fidget slightly but is unlikely to be jumping around in a fixed a location. Movement models thus can be combined with the trilateration and pressure estimates for greater location accuracy and further smoothing of location estimates.

One of the potential applications for the wireless device may be apparent from the layout of the floor plan 702. The floor plan 702 may, for example, be the floor plan of a nursing home with eight rooms 704, two common areas 707 and a dining area 708. The wireless device 108 might be packaged to be carried in the shirt pocket of the nursing home residents. The wireless device 108 might then be used as a resident safety device. For example, if a wireless device indicates that it is located near the floor level at the bottom of the stairs 710 and it is 2:00 AM, someone should probably investigate the possibility that a resident has fallen down the stairs. Similarly, if a resident is in the bathroom 706 for an unusually long period of time, it may indicate a problem and someone probably should investigate further.

Referring to FIG. 8, an exemplary wireless device report 802 is shown. This report may be generated by the wireless device to be sent to the server for location processing. The report lists beacon IDs that corresponds to network nodes from which a beacon was received. The report also lists the time the beacon was received and the RSS of the beacon. This information may be then used by the server to trilaterate the location of the wireless device. Also provided in the report is the atmospheric pressure measured at the wireless device. The server may then determine the vertical location of the wireless device by comparing the measured atmospheric pressure with the atmospheric pressure measured at a known vertical location near the wireless device.

Also provided in the report is the magnetic heading and a three dimensional acceleration vector. This information may also be used by the server to determine the location of the wireless device. The state of other sensors on the wireless device such as rate gyros may also be included in the report.

Referring to FIG. 9 an exemplary network node report 902 is shown. In this embodiment the network nodes also report observed RSS. The beacon ID, the time and the measured RSS are included in the report sent to the server. As explained previously, the received signal strengths may be used by the server to survey a newly installed network node or they may be used to refine a path loss model. RSS can also be used to determine if a network node is failing or if it is broadcasting with a power level that is higher or lower than the expected broadcast power level.

Network nodes collocated with barometric pressure sensors will also report the atmospheric pressure at the network node. As explained previously, the barometric pressure may be used by the server to determine the location of the wireless device.

As explained previously, for newly installed network nodes, the atmospheric pressure at the network node can be compared with the atmospheric pressure of other network nodes to determine the vertical location of the network node. If the network node is packaged with a plug for installing in AC outlet building map data may be used to further refine the location of the newly installed network node. Over time, the server may also be able to determine a barometric pressure sensor's, error, bias and failure by comparing the pressure measurements with the pressure measurements made by other barometric pressure sensors in known locations in the building.

Figure 10:
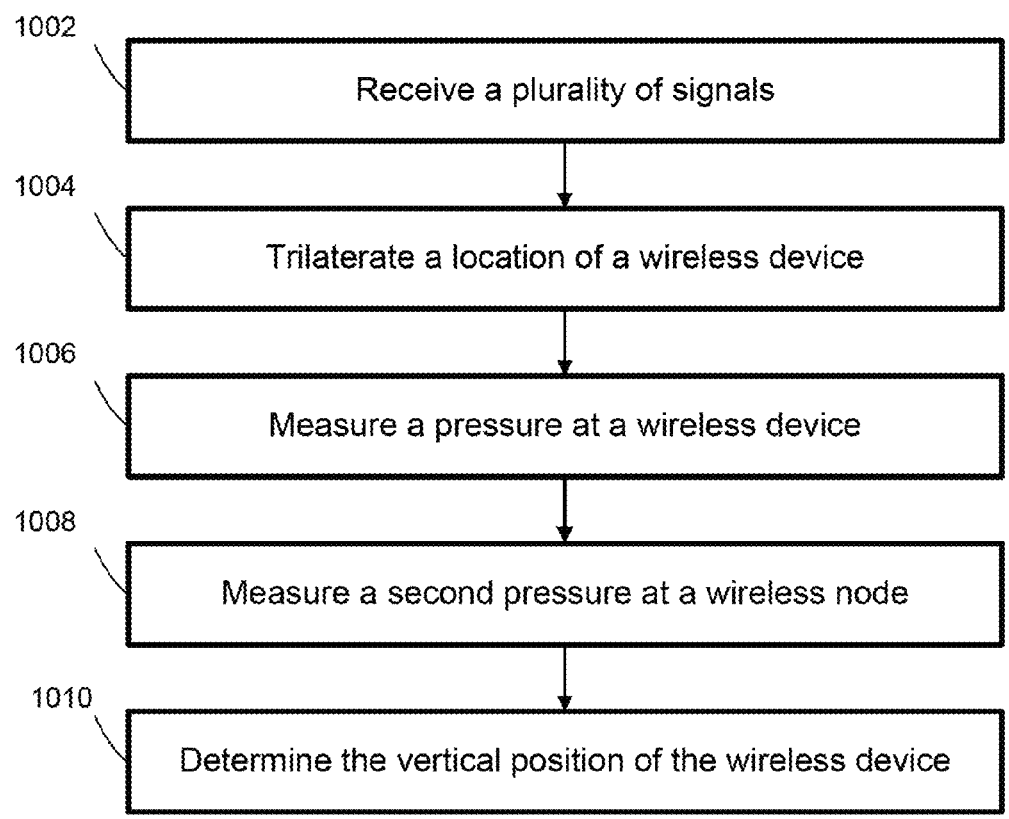
FIG. 10 shows an exemplary method of determining the location of a wireless device.

Referring to FIG. 10, an exemplary method for determining the location of a wireless device is shown. The method comprises receiving a plurality of signals 1002, trilaterating a location of a wireless device 1004, measuring a pressure at the wireless device 1006, measuring a second pressure at a network node 1008 and estimating the vertical position of the wireless device 1010.

According to an exemplary embodiment, a plurality of signals are received 1002. An RSS associated with each of the received signals is measured. Each of the measured RSSs may then be used to determine the distance from the transmitter to the receiver using a path loss model. The distances may, in turn be used to determine the position of the receiver (if all of the signals are received by the same receiver) or the position of the transmitter (if the received signals are transmitted by the same transmitter). The distances may then be used to trilaterate the location of the wireless device 1004.

The pressure at the wireless device may be measured 1006. The pressure may then be compared with the measured pressure at another location near the wireless device 1008. A lapse rate or other atmospheric model may be used in the comparison. The vertical position may be then be determined 1010.

As explained previously the vertical location of the wireless device may be determined through three dimensional (vertical and horizontal) trilateration. However, incorporating barometric comparisons can provide greater location accuracy not achievable through trilateration alone.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention may be embodied in other specific forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A method for determining a location of a wireless device, the method comprising:
receiving, by a server, measured data, from each of a plurality of network nodes, the measured data including a respective pressure measurement and a list of received signal strength measurements, wherein each received signal strength measurement in the list is measured by the respective network node;
receiving, by the server, a wireless device pressure measurement value as measured at the wireless device;
determining, by the server, a vertical location of the wireless device by interpolation using the wireless device pressure measurement value and the measured data; and
determining, by the server, the location of the wireless device using the vertical location of the wireless device and the measured data.

2. The method of claim 1 wherein the determining the location of the wireless device includes using a floor plan information.

3. The method of claim 1 further comprising:
receiving a plurality of received signal strengths associated with the wireless device.

4. The method of claim 3 further comprising:
trilaterating a horizontal location of the wireless device using the plurality of received signal strengths associated with the wireless device.

5. The method of claim 1 further comprising:
transmitting the location of the wireless device, by the server.

6. The method of claim 3 wherein the plurality of received signal strengths associated with the wireless device are measured at a newly installed network node and further comprising:
determining a vertical location of a newly installed network node based on the plurality of measured second pressures; and
determining the location of the newly installed network node using the plurality of received signal strengths and the vertical location of the newly installed network node.

7. An apparatus for determining a location of a wireless device, the apparatus comprising a server, the server comprising:
means for receiving, measured data from each of a plurality of network nodes, the measured data including a respective pressure measurement and a list of received signal strength measurements, wherein each received signal strength measurement in the list is measured by the respective network node;
means for receiving a wireless device pressure measurement value as measured at the wireless device;
means for determining a vertical location of the wireless device by interpolation using the wireless device pressure measurement value and the measured data; and
means for determining the location of the wireless device using the vertical location of the wireless device and the measured data.

8. The apparatus of claim 7 wherein the means for determining the location of the wireless device includes using a floor plan information.

9. The apparatus of claim 7 further comprising:
means for receiving a plurality of received signal strengths associated with the wireless device.

10. The apparatus of claim 9 further comprising:
means for trilaterating a horizontal location of the wireless device using the plurality of received signal strengths associated with the wireless device.

11. The apparatus of claim 7 further comprising means for transmitting the location of the wireless device.

12. An apparatus for determining a location of a wireless device, the apparatus comprising a server, the server configured to execute the instructions to:
receive measured data from each of a plurality of network nodes, the measured data including a respective pressure measurement and a list of received signal strength measurements, wherein each received signal strength measurement in the list is measured by the respective network node;
receive a wireless device pressure measurement value as measured at the wireless device;
determine a vertical location of the wireless device by interpolation using the wireless device pressure measurement value and the measured data; and
determine the location of the wireless device using the vertical location of the wireless device and the measured data.

13. The apparatus of claim 12 wherein the server is further adapted to determine the location of the wireless device using a floor plan information.

14. The apparatus of claim 12 wherein the server is further configured to execute instructions to:
receive a plurality of received signal strengths associated with the wireless device.

15. The apparatus of claim 14 wherein the server is further configured to execute instructions to trilaterate a horizontal location of the wireless device using the received signal strengths associated with the wireless device.

16. The apparatus of claim 12 wherein the server is further configured to execute instructions to transmit the location of the wireless device.

17. A computer program product embedded on a tangible non-transitory computer readable medium, the computer program product having instructions for estimating a location of a wireless device, the computer program product comprising:
instructions for receiving measured data from each of a plurality of network nodes, the measured data including a respective pressure measurement and a list of received signal strength measurements, wherein each received signal strength measurement in the list is measured by the respective network node;
instructions for receiving a wireless device pressure measurement value as measured at the wireless device;
instructions for determining a vertical location of the wireless device by interpolation using the wireless device pressure measurement value and the measured data; and
instructions for determining the location of the wireless device using the vertical location of the wireless device and the measured data.

* * * * *